UNITED STATES PATENT OFFICE 2,647,923

METHOD FOR PREPARING ESTERS OF ALPHA,BETA-DICHLOROPROPIONIC ACID

Charles D. Burton, Glenside, Pa., assignor to Rohm & Haas Company, Philadelphia, Pa., a corporation of Delaware No Drawing. Application March 15, 1952,
Serial No. 276,875

14 Claims. (Cl. 260—487)

1

This invention deals with a process for preparing esters of α,β-dichloropropionic acid. It comprises preparing α,β-dichloropropionates by reacting an acrylic ester with chlorine in the presence of an N-substituted amide.

Chlorination of acrylates presents problems. If chlorine is passed into such an ester, no immediate reaction usually occurs. After an induction period which varies in length of time from lot to lot of acrylate, reaction may suddenly begin and proceed violently, ceasing when the chlorine dissolved in the acrylate has been consumed. Reaction occurs again only after an uncertain period of passing chlorine into the reaction mixture. At times the reaction goes completely out of hand. Addition products, substitution products, and polymeric substances are formed and the yield of α,β-dichloropropionate is not high.

Behavior during chlorination is improved by the presence of an alcohol such as methanol. Yields of pure α,β-dichloropropionates are not, however, correspondingly improved. The reaction products are not readily separable and the chlorinated ester contains too little chlorine to be pure α,β-dichloropropionate. Apparently ethers and other by-products distill over with the desired α,β-dichloropropionates and are not readily separable therefrom.

It has now been found that in the presence of a small amount of an amide of the preferred type

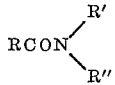

chlorine adds smoothly and rapidly to acrylic esters at the double bond of the acrylic residue. In the above formula R represents hydrogen or an aliphatic hydrocarbon group, usually one of not over eight carbon atoms and preferably one of not over three carbon atoms, at least one of the groups R' and R" is a hydrocarbon substituent, and R' and R" represent hydrogen or hydrocarbon groups of not over 12 carbon atoms each, particularly aliphatic groups, and preferably alkyl groups of not over four carbon atoms each. R' and R" may together form a divalent chain, such as

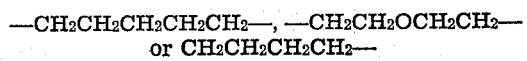

which forms a heterocycle with the nitrogen.

Typical amides which have been found to act as regulators or catalysts in the chlorination of acrylic esters include N-methylformamide, N,N-

2 dimethylformamide, morpholineformamide, acetomorpholide, acetopiperidide, N-methylacetamide, N-ethylacetamide, N-butylacetamide, N-cyclohexylacetamide, N-methylacrylamide, N-tert.-butylacrylamide, N-dodecylacrylamide, N,N-dimethylbutyramide, N-methyl-2-ethylhexamide, N,N-diethylhexamide, N-dodecylhexamide, N-methyl-N-phenylacetamide, N-methyl-N-phenylacrylamide, N-benzylformamide, N,N'-dimethyladipamide, N,N,N',N'-tetramethylsuccinamide, and the like. The amount of such amide used is at least one half per cent of the weight of the acrylic ester to be chlorinated and should be more than one per cent for securing a marked activating effect. There is no sharp upper proportion but amounts more than about 10% are unneeded and not economical. The optimum range is 2% to 5%.

A great variety of acrylic esters has proved amenable to the process of this invention, this being one of the advantages thereof. There may be used an ester of acrylic acid and a monohydric alcohol, particularly an alkyl acrylate such as methyl, ethyl, propyl, isopropyl, butyl, sec.-butyl, tert.-butyl, isobutyl, hexyl, octyl, isononyl, decyl, dodecyl, cetyl, octadecyl, and the like acrylates, alkenyl acrylates such as allyl acrylate, methallyl acrylate, undecenyl acrylate, oleyl acrylate, and the like with some chance for chlorine to be taken up in the alkenyl group, aralkyl acrylates including benzyl and methylbenzyl acrylates, cycloalkyl acrylates such as cyclohexyl, methylcyclohexyl, terpenyl acrylates, and cyclopentyl acrylates, and other acrylates, including those having inert substituents in the alcohol residue, such as methoxyethyl, ethoxyethyl, dimethylaminoethyl, tetrahydrofurfuryl, ethylthioethyl, etc.

The chlorination of acrylic esters is best carried out between 30° and 40° C., but the range from 20° to 50° C. can be used, particularly with esters having bulky substituents. In a few cases even higher temperatures lead to the desired α,β-dichloropropionates without noticeable contamination from substituted products.

The addition reaction of chlorine is carried out by direct addition of chlorine to the ester carrying an activating amount of an N-substituted amide. In some cases the acrylic ester may be dissolved in an inert solvent which is readily separable from the reaction product, as by distillation. Chlorinated solvents are particularly appropriate, but alcohols which distill at quite different points than the dichloropropionates or which can be left in the residue may be used.

The reaction has been performed in the presence of ethylene glycol, for example, and also of glycerin, but yields were not as favorable as with chlorinated solvent or without solvent.

Typical preparations are described in the following illustrative examples, in which parts are by weight.

Example 1

Three thousand and forty-five parts of methyl acrylate, freshly distilled at 79°–81° C., and 61 parts of dimethylformamide were placed in a three-necked flask equipped with thermometer, centrifugal stirrer, gas inlet tube directed to the bottom of the stirrer, and a reflux condenser venting into a hood. With rapid stirring, commercial chlorine gas was passed through a sulfuric acid bubbler (for drying and rate control), through a large trap, and into the reaction flask. The temperature was maintained at 25° C. with an ice-water bath. After 8.83 hours, 2764 parts of chlorine had been absorbed as shown by the increased weight of the flask. The 244 parts of excess chlorine was removed under vacuum and the methyl $\alpha,\beta$-dichloropropionate was fractionally distilled under reduced pressure through a column which was packed with glass helices. There was received from the distillation 43 parts of forerun and 5382 parts of methyl $\alpha,\beta$-dichloropropionate, distilling at 67° C./15 mm.–69° C./17 mm., having a refractive index, $n_D^{25}$, of 1.4503 and containing 44.7% of chlorine. Ninety-eight parts of residue remained in the still. Product yield was 97% based on methyl acrylate.

To 1960 parts of methyl $\alpha,\beta$-dichloropropionate there was slowly added a solution of 553 parts of sodium hydroxide in 1250 parts of water with the temperature of the mixture kept at about 40° C. with the aid of cooling. The reaction mixture was cooled and diluted to about 4000 parts with water. Two layers formed and were separated. The lower organic layer was dried over calcium chloride, filtered, treated with a little $\beta$-naphthol, and fractionally distilled through a packed column. The main fraction thus obtained was redistilled, about 1100 parts being obtained at 55.5° C./50 mm. This material was identified as methyl $\alpha$-chloroacrylate.

Other bases can be substituted for the above sodium hydroxide with like effect. Salts of strong bases and weak acids give the same end result.

Example 2

(a) Four hundred and thirty parts of methyl acrylate, distilled at 79°–81° C., and 11 parts of dimethylformamide were placed in a three-necked flask equipped as in Example 1. With rapid stirring at 35° C., commercial chlorine gas was passed into the reactor as in Example 1. After 2.67 hours, 364 parts of chlorine had been absorbed as shown by the increase in weight of the flask. The nine parts excess chlorine was blown out with air and the reaction mixture was washed with an equal volume of water. Upon fractional distillation there was received seven parts of forerun and 675 parts of methyl $\alpha,\beta$-dichloropropionate, distilling at 72° C./20 mm., having a refractive index, $n_D^{25}$, of 1.4505, and containing 44.5% of chlorine. Twenty-three parts of residue remained in the still. Product yield was 86% based on methyl acrylate.

(b) Twenty-three hundred and forty-five parts of methyl acrylate, distilling at 79°–81° C., and 974 parts of methyl alcohol were placed in the equipment described in Example 1. With rapid stirring at 30°–40° C., commercial chlorine gas was passed into the reactor as described above. After ten hours 1710 parts of chlorine had been absorbed as shown by the weight increase of the flask. The material was fractionally distilled under reduced pressure and there was successively received 1604 parts of forerun, 755 parts of material distilling at 63° C./22 mm.–75° C/14 mm. and having 37.4% of chlorine; 993 parts of material distilling at 69° C./15 mm.–75.5° C./19 mm. and containing 41.1% of chlorine; 449 parts of material distilling at 75.5° C./19 mm.–76° C./19 mm. and containing 40.2% of chlorine; and 726 parts of material distilling at 76.5° C./19 mm.–81° C./19 mm. and containing 34.4% of chlorine. Four hundred and fifty-six parts of residue remained in the still. The refractive indexes at 25° C. gradually increased from 1.4314 at the end of the forerun to 1.4477 in the middle of the largest fraction and then decreased steadily to 1.4370. Product yield of material having refractive indexes, $n_D^{25}$, of 1.4457 to 1.4477 and a chlorine content of 40.7% was 34% based on methyl acrylate.

Example 3

The method of Example 2 was followed in general, using 430 parts of methyl acrylate and 13 parts of N,N-dimethylacetamide and passing in chlorine with the temperature of the reaction mixture held at 35° C. After 1.08 hours 352 parts of chlorine had been absorbed. The reaction mixture was washed with water and fractionally distilled. After a small forerun the main fraction was taken at 71° C./18 mm., amounting to 678 parts and having a chlorine content of 44.3% and a refractive index of 1.4505. The product was methyl $\alpha,\beta$-dichloropropionate.

Example 4

In the same way 433 parts of methyl acrylate and 17 parts of N,N-diethylacetamide were mixed and chlorinated at 35° C. There were absorbed in 2.25 hours 365 parts of chlorine. The mixture was washed and distilled with a yield of 693 parts of practically pure methyl $\alpha,\beta$-dichloropropionate.

Example 5

In the same way there were mixed 430 parts of methyl acrylate and 29 parts of N,N-diethyl-2-ethylhexamide and chlorine was passed into this mixture at 35° C. Within two hours 381 parts of chlorine had been taken up. The mixture was washed and fractionally distilled. At 68° C./16 mm.–69° C./17 mm. there was obtained 676 parts of pure methyl $\alpha,\beta$-dichloropropionate. The chlorine analysis showed the presence of 45.2% of chlorine.

Example 6

In the same way there were mixed 430 parts of methyl acrylate and 11 parts of N-methylacetamide. The mixture was chlorinated at about 35° C. In two hours 366 parts of chlorine had been absorbed. The mixture was washed with water, blown with air, and distilled. At 68° C./16 mm.–70° C./17 mm. a fraction of 670 parts of methyl $\alpha,\beta$-dichloropropionate was obtained in a purity of 97%.

Example 7

In the same way 431 parts of methyl acrylate and 45.5 parts of N-dodecyl-2-ethylhexamide were mixed and chlorinated at about 35° C. In two hours 362 parts of chlorine had been absorbed. The reaction was washed and distilled.

The main fraction of 595 parts taken at 68° C./16 mm. was pure methyl α,β-dichloropropionate.

*Example 8*

In the same way 258 parts of methyl acrylate and 11 parts of N-tert.-butylacrylamide were mixed and treated with chlorine at 35° C. In 3.7 hours a total of 212 parts of chlorine was absorbed. The reaction mixture was washed and distilled. There was obtained at 65.5° C./11 mm. a fraction of 233 parts of methyl α,β-dichloropropionate.

*Example 9*

In the same way 258 parts of methyl acrylate and 21 parts of N-dodecylacrylamide were mixed and chlorinated at about 35° C. In 2.25 hours 200 parts of chlorine was taken up. The reaction mixture was washed and distilled to give 219 parts of pure methyl α,β-dichloropropionate.

*Example 10*

In the same way 258 parts of methyl acrylate and 15.6 parts of N-methyl-N-phenylacrylamide were mixed and chlorinated at 35° C. In 2.4 hours 204 parts of chlorine was absorbed. The reaction mixture was washed and distilled to give at 67.5° C./15.5 mm. 252 parts of methyl α,β-dichloropropionate.

A similar reaction with formamide as catalyst gave a yield of 34%, while with acetamide the yield was 27%. It is evident that N-substituted amides are far more effective. Most economical is N,N-dimethylformamide.

*Example 11*

There were mixed 2838 parts of ethyl acrylate and 57 parts of N,N-dimethylformamide. Chlorine was slowly passed into the mixture with the temperature maintained at 30° C. Within three hours 2085 parts of chlorine was absorbed. On distillation there was obtained a fraction of 3755 parts of ethyl α,β-dichloropropionate, having a distillation range of 76° C./15 mm.–76.5° C./15 mm. and a refractive index, $n_D^{25}$, of 1.4456.

*Example 12*

In a similar way a mixture of 640 parts of tert.-butyl acrylate and 11 parts of N,N-dimethylformamide was chlorinated at 30° C.–40° C. After 1.25 hours there was absorbed chlorine in an amount of 361 parts. Upon distillation a fraction of 635 parts of tert.-butyl α,β-dichloropropionate was obtained. This product contained 36% of chlorine and had a refractive index, $n_D^{25}$, of 1.4405.

This material was treated with caustic soda solution and converted to tert.-butyl α-chloroacrylate by the method described above.

*Example 13*

There were mixed 621 parts of cyclohexyl acrylate and 9 parts of N,N-dimethylformamide. The mixture was chlorinated at 35° C. In 1.67 hours 312 parts of chlorine was taken up. Upon distillation a main fraction of 720 parts was obtained. It was 98% pure cyclohexyl α,β-dichloropropionate. It distilled at 98° C.–98.5° C./2.5 mm. It had a refractive index of 1.4757 at 25° C.

*Example 14*

There were mixed 324 parts of benzyl acrylate and 6.5 parts of N,N-dimethylformamide. With the temperature at 40° C. the mixture was treated with 145 parts of chlorine in 1.75 hours. Upon distillation at 113° C./0.9 mm.–104° C./0.6 mm. there was obtained a cut of 365 parts of pure benzyl α,β-dichloropropionate. It contained 30.3% of chlorine (theory 30.5%). It had a refractive index of 1.5250 at 25° C.

*Example 15*

There were mixed 368 parts of n-octyl acrylate and 11 parts of N,N-dimethylformamide. Chlorine was added at 35° C. in an amount of 141 parts within one hour. Upon distillation a fraction of 458 parts was obtained at 102° C./0.5 mm.–115° C./0.85 mm. This was n-octyl α,β-dichloropropionate in a purity of over 96%. It had a refractive index of 1.4504.

*Example 16*

In the same way a mixture of 241 parts of dodecyl acrylate and 10 parts of N,N-dimethylformamide was chlorinated at 35° C.–40° C. with 76 parts of chlorine in 1.67 hours. The main fraction was taken at 158° C./1.2 mm.–160° C./0.8 mm. in an amount of 268 parts. It contained 22.7% of chlorine. The theoretical chlorine content for dodecyl α,β-dichloropropionate is 22.8%. The fraction has a refractive index of 1.4550.

*Example 17*

In the same way there were mixed 324 parts of octadecyl acrylate (containing some cetyl acrylate) and 19 parts of N,N-dimethylformamide and the mixture was heated to 45° C. Chlorine was slowly passed into the mixture at 40°–50° C. for 1.58 hours. Chlorine was absorbed in an amount of 82 parts. The reaction mixture was washed with water and stripped under reduced pressure to yield 369 parts of a residue which corresponded fairly closely in composition to octadecyl α,β-dichloropropionate, containing 17% of chlorine (theory 18%) and having a refractive index, $n_D^{25}$, of 1.4574.

In the above examples there is shown in detail the reaction of chlorine and esters of acrylic acid and monohydric alcohols in the presence of an N-substituted amide of an aliphatic carboxylic acid. It must be pointed out, however, that the reaction is also applicable to esters of acrylic acid and polyhydric alcohols. Of especial interest are such esters as ethylene diacrylate, propylene diacrylate, the diacrylate of diethylene glycol, 1,2-octylene diacrylate, 1,3-decylene diacrylate, glycerin triacrylate, etc.

I claim:

1. A process for preparing esters of α,β-dichloropropionic acid and monohydric alcohols which comprises chlorinating between 20° C. and about 50 °C. an ester of acrylic acid and a monohydric alcohol in the presence of an N-substituted aliphatic carboxylic amide.

2. A process for preparing esters of α,β-dichloropropionic acid and monohydric alcohols which comprises passing at a temperature between 20° C. and about 50° C. chlorine into a mixture of an ester of acrylic acid and a monohydric alcohol and of an N-substituted amide of the formula

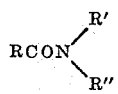

wherein R is a member of the class consisting of hydrogen and aliphatic hydrocarbon groups of not over eight carbon atoms, and R' and R'' are members of the class consisting of hydrogen and hydrocarbon groups of not over 12 carbon atoms, at least one of the terms R' and R'' being a said hydrocarbon group.

3. A process for preparing esters of α,β-dichloropropionic acid and saturated aliphatic monohydric alcohols of not over 18 carbon atoms which comprises passing at a temperature between 20° C. and about 50° C. chlorine into a mixture of an ester of acrylic acid and a said alcohol and of an N-substituted amide of the formula

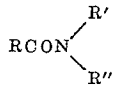

wherein R is a member of the class consisting of hydrogen and aliphatic hydrocarbon groups of not over eight carbon atoms, and R' and R" are members of the class consisting of hydrogen and hydrocarbon groups of not over 12 carbon atoms, at least one of the terms R' and R" being a said hydrocarbon group.

4. A process for preparing alkyl α,β-dichloropropionates which comprises reacting between 20° C. and about 50° C. an alkyl acrylate and chlorine in the presence of an N-substituted amide of the formula

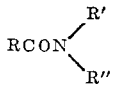

wherein R is a member of the class consisting of hydrogen and aliphatic hydrocarbon groups of not over eight carbon atoms, and R' and R" are members of the class consisting of hydrogen and hydrocarbon groups of not over 12 carbon atoms, at least one of the terms R' and R" being a said hydrocarbon group.

5. A process according to claim 4 wherein the amide is N,N-dimethylformamide.

6. A process for preparing methyl α,β-dichloropropionate which comprises reacting between 30° C. and 40° C. methyl acrylate and chlorine in the presence of an N-substituted amide of the formula

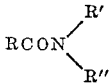

wherein R is a member of the class consisting of hydrogen and aliphatic hydrocarbon groups of not over eight carbon atoms, and R' and R" are members of the class consisting of hydrogen and hydrocarbon groups of not over 12 carbon atoms, at least one of the terms R' and R" being a said hydrocarbon group.

7. A process according to claim 6 wherein the amide is N,N-dimethylformamide.

8. A process according to claim 6 wherein the amide is N,N-dimethylacetamide.

9. A process for preparing ethyl α,β-dichloropropionate which comprises reacting between 20° C. and about 50° C. ethyl acrylate and chlorine in the presence of an N-substituted amide of the formula

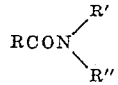

wherein R is a member of the class consisting of hydrogen and aliphatic hydrocarbon groups of not over eight carbon atoms, and R' and R" are members of the class consisting of hydrogen and hydrocarbon groups of not over 12 carbon atoms, at least one of the terms R' and R" being a said hydrocarbon group.

10. A process according to claim 9 wherein the amide is N,N-dimethylformamide.

11. A process for preparing cyclohexyl α,β-dichloropropionate which comprises reacting between 20° C. and about 50° C. cyclohexyl acrylate and chlorine in the presence of an N-substituted amide of the formula

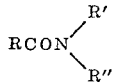

wherein R is a member of the class consisting of hydrogen and aliphatic hydrocarbon groups of not over eight carbon atoms, and R' and R" are members of the class consisting of hydrogen and hydrocarbon groups of not over 12 carbon atoms, at least one of the terms R' and R" being a said hydrocarbon group.

12. The process of claim 11 wherein the amide is N,N-dimethylformamide.

13. A process for preparing benzyl α,β-dichloropropionate which comprises reacting between 20° C. and about 50° C. benzyl acrylate and chlorine in the presence of an N-substituted amide of the formula

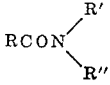

wherein R is a member of the class consisting of hydrogen and aliphatic hydrocarbon groups of not over eight carbon atoms, and R' and R" are members of the class consisting of hydrogen and hydrocarbon groups of not over 12 carbon atoms, at least one of the terms R' and R" being a said hydrocarbon group.

14. The process of claim 13 wherein the amide is N,N-dimethylformamide.

CHARLES D. BURTON.

No references cited.